US012578277B2

(12) United States Patent (10) Patent No.: US 12,578,277 B2

Inose et al. (45) Date of Patent: Mar. 17, 2026

(54) SLAG COMPONENT ANALYSIS METHOD, SLAG BASICITY ANALYSIS METHOD, AND MOLTEN IRON REFINING METHOD

(71) Applicant: JFE STEEL CORPORATION, Tokyo (JP)

(72) Inventors: Masao Inose, Tokyo (JP); Seiya Sugawara, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 37 days.

(21) Appl. No.: 18/560,104

(22) PCT Filed: Mar. 10, 2022

(86) PCT No.: PCT/JP2022/010734
§ 371 (c)(1),
(2) Date: Nov. 10, 2023

(87) PCT Pub. No.: WO2022/244408
PCT Pub. Date: Nov. 24, 2022

(65) Prior Publication Data
US 2024/0241058 A1 Jul. 18, 2024

(30) Foreign Application Priority Data
May 17, 2021 (JP) ................................. 2021-083515

(51) Int. Cl.
G01N 21/71 (2006.01)
C21C 5/46 (2006.01)

(52) U.S. Cl.
CPC ......... G01N 21/718 (2013.01); C21C 5/4673 (2013.01); *G01N 2201/0697* (2013.01); *G01N 2201/129* (2013.01)

(58) Field of Classification Search
CPC .... G01N 21/718; G01N 33/205; G01N 33/20; G01J 5/004; G01J 5/0044
See application file for complete search history.

(56) References Cited

U.S. PATENT DOCUMENTS 10,281,406 B1 * 5/2019 Russo ..................... G01J 3/443
2006/0250614 A1 11/2006 Plessers et al.
(Continued)

FOREIGN PATENT DOCUMENTS

JP S60231141 A 11/1985
JP H09166589 A 6/1997
(Continued)

OTHER PUBLICATIONS

Translation of JP 2017193784 (Year: 2017).*
Sturm et al. "Laser-Induced Breakdown Spectroscopy for 24/7 Automatic Liquid Slag Analysis at a Steel Works", Oct. 7, 2014, American Chemical Society, 0003-2700, 1520-6882, pp. 9687-9692.*
(Continued)

*Primary Examiner* — Kara E. Geisel
(74) *Attorney, Agent, or Firm* — KENJA IP LAW PC

(57) ABSTRACT

Provided is a slag component analysis method capable of quickly and accurately measuring slag components generated during refining of molten iron. The method comprises: irradiating a surface of slag to be analyzed with a pulse laser a plurality of times to turn part of the slag into plasma; dispersing excitation light obtained from the slag turned into plasma and acquiring an emission spectrum of an element contained in the slag per one pulse laser irradiation or per a plurality of pulse laser irradiations; and deriving a target component concentration or component amount ratio from the acquired emission spectrum, wherein the slag to be analyzed is slag generated in a converter-type refining furnace, and in the process of turning part of the slag into plasma, the pulse laser is applied from a side of the converter-type refining furnace tilted to remove the slag generated in the converter-type refining furnace.

18 Claims, 4 Drawing Sheets

Cone whose angle is within 45° with respect to straight line parallel to rotation axis Rotation axis
Laser light source
Work floor Straight line parallel to rotation axis Angle Slag

(56) References Cited

U.S. PATENT DOCUMENTS

| | | | | |
|---|---|---|---|---|
| 2017/0074800 A1* | 3/2017 | Benmansour | .......... | G01J 3/443 |
| 2018/0120235 A1* | 5/2018 | Vicente Rojo | ........ | G01J 3/2803 |

FOREIGN PATENT DOCUMENTS

| | | |
|---|---|---|
| JP | H10152714 A | 6/1998 |
| JP | H1123496 A | 1/1999 |
| JP | H11304675 A | 11/1999 |
| JP | 2005024446 A | 1/2005 |
| JP | 2011141293 A | 7/2011 |
| JP | 2016048235 A | 4/2016 |
| JP | 2016145405 A | 8/2016 |
| JP | 2017193784 A | 10/2017 |
| KR | 1020190008231 A | 1/2019 |

OTHER PUBLICATIONS

Feng-Zhong Dong et al., Recent progress on the application of LIBS for metallurgical online analysis in China, Frontiers of Physics, 2012, pp. 679-689, vol. 7, No. 6.

Oct. 9, 2024, the Extended European Search Report issued by the European Patent Office in the corresponding European Patent Application No. 22804328.7.

Apr. 12, 2022, International Search Report issued in the International Patent Application No. PCT/JP2022/010734.

Oct. 20, 2025, Office Action issued by the Korean Intellectual Property Office in the corresponding Korean Patent Application No. 10-2023-7039228 with English language concise statement of relevance.

* cited by examiner

*FIG. 1A*
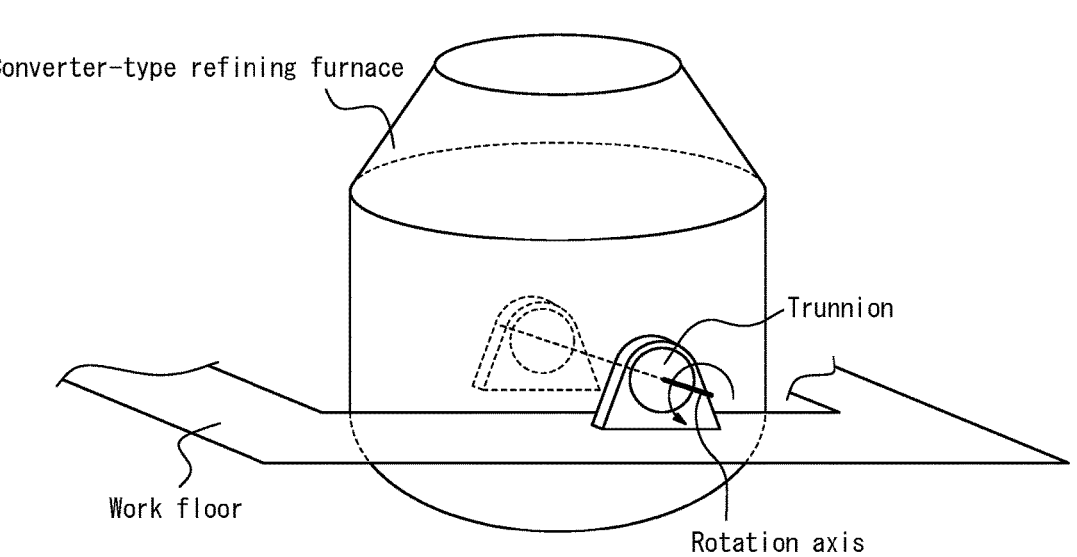
Converter-type refining furnace
Trunnion
Work floor
Rotation axis
*FIG. 1B*
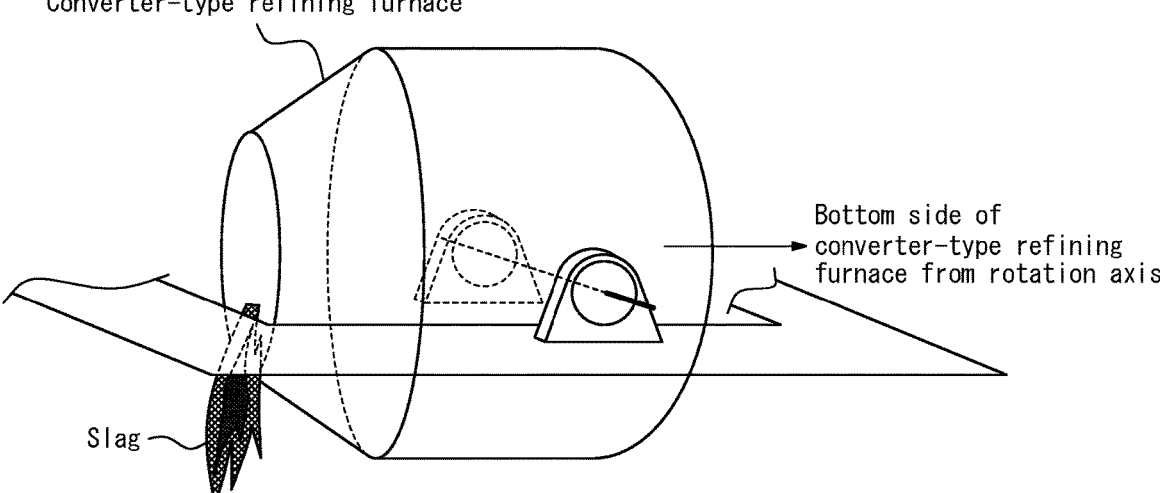
Converter-type refining furnace
Bottom side of converter-type refining furnace from rotation axis
Slag
Throat side of converter-type refining furnace from rotation axis Straight line parallel to rotation axis Angle Laser light source    Rotation axis    Work floor Cone whose angle is within 45° with respect to straight line parallel to rotation axis Rotation axis
Laser light source
Work floor Straight line parallel to
rotation axis Angle Slag Straight line parallel to rotation axis Laser light source Rotation axis    Work floor Rotation axis Work floor Straight line parallel to rotation axis Laser light source Slag

SLAG COMPONENT ANALYSIS METHOD, SLAG BASICITY ANALYSIS METHOD, AND MOLTEN IRON REFINING METHOD

TECHNICAL FIELD

The present disclosure relates to a method of analyzing the components of slag generated during refining of molten iron, a method of analyzing the basicity of slag, and a method of refining molten iron.

BACKGROUND

In recent years, various hot metal pretreatment techniques and hot metal decarburization treatment techniques have been developed because of the need to achieve both environmental consciousness such as carbon dioxide gas emission regulations and high productivity. One of the new hot metal pretreatment techniques proposed under such circumstances is a hot metal pretreatment technique that uses one converter-type refining furnace to continuously perform desiliconization treatment and dephosphorization treatment on hot metal with a deslagging process being performed therebetween.

For example, JP H10-152714 A (PTL 1) proposes the following hot metal pretreatment technique: First, desiliconization treatment is performed in a converter-type refining furnace with the addition amount of a CaO-based solvent being adjusted so that the basicity (basicity=(mass % CaO)/(mass % SiO$_2$)) of slag will be in the range of 0.3 to 1.3, thereafter the converter-type refining furnace is tilted to remove slag generated in the furnace (slag generated by desiliconization treatment is called "desiliconized slag") from the throat, and thereafter the hot metal remaining in the furnace is subjected to dephosphorization treatment by adding a CaO-based solvent. Such deslagging performed between two refining processes in one converter-type refining furnace is also referred to as "intermediate deslagging" or "intermediate deslagging process".

In PTL 1, in the intermediate deslagging process, slag in the furnace is removed by tilting the converter-type refining furnace. However, simply tilting the converter-type refining furnace cannot sufficiently remove slag depending on the composition of the slag. Hence, undesirable phenomena, such as refining taking longer than expected or refining not progressing as intended, may occur due to slag remaining in the converter-type refining furnace.

Given that the basicity of slag significantly influences the slag viscosity and the dephosphorization efficiency, controlling the basicity of slag is extremely important. The basicity of slag is controlled by adjusting the amount of slag-forming agent added. However, since the required amount of slag-forming agent is not always constant and changes for each charge, it is not easy to add an appropriate amount of slag-forming agent. By controlling the basicity of desiliconized slag after desiliconization treatment to about 1.20 and minimizing the amount of slag-forming agent added, it is possible to achieve efficient deslagging and appropriate dephosphorization treatment. However, since it is not easy to add an appropriate amount of slag-forming agent as mentioned above, there are instances in which more slag-forming agent than necessary is added, which leads to an increase in costs. For further cost reduction, the amount of slag-forming agent added needs to be limited to the minimum necessary without excess or deficiency. This requires accurate and quick determination of the composition of slag in the furnace before the addition of the slag-forming agent.

For these reasons, determining the slag composition during refining is essential when refining molten iron, and is very important for quick and accurate refining.

For slag composition analysis (component analysis), quantitative analysis using the intensity of fluorescent X-rays has been widely performed conventionally. In X-ray fluorescence analysis, the measurement surface of an analysis sample needs to be smoothed in order to perform quantification with high accuracy. Examples of methods of preparing analysis samples include a glass bead method in which collected slag is melted with a flux such as Na$_2$B$_4$O$_7$ or Li$_2$B$_4$O$_7$ and vitrified to form an analysis sample, a briquette method in which ground slag is mixed with a small amount of organic binder such as starch and cellulose and the mixture is pressed into a disk shape, and a direct method in which a collected slag sample is directly subjected to X-ray fluorescence analysis. For example, JP H11-23496 A (PTL 2) discloses a slag composition analysis method using the briquette method, wherein slag is made into ultrafine particles of 10 μm or less in average particle size using a jet mill and the ultrafine particles are pressed into a disk shape in a binderless manner. JP H9-166589 A (PTL 3) and JP H11-304675 A (PTL 4) propose methods of inserting a sampler into molten slag, rapidly cooling the slag with the sampler, and collecting a slag sample having a smooth surface.

However, with the slag composition analysis method disclosed in PTL 2, grinding needs to be performed to such a level that enables pressing, and accordingly it is difficult to prepare the analysis sample by the end of the intermediate deslagging process. The methods disclosed in PTL 3 and PTL 4 involve rapid cooling of slag, and therefore the analysis sample is susceptible to segregation, which is problematic in terms of analysis accuracy. Thus, there are problems of time constraints, accuracy, and the like in collecting slag during refining and analyzing the components of the slag by X-ray fluorescence analysis.

The foregoing problems can be solved if the composition of slag during refining can be directly analyzed. JP 2011-141293 A (PTL 5) proposes a slag composition analysis method in which, while a consumable probe intended to come into contact with an analysis object is immersed in the analysis object, a laser light is used in the probe.

CITATION LIST

Patent Literature

PTL 1: JP H10-152714 A
PTL 2: JP H11-23496 A
PTL 3: JP H9-166589 A
PTL 4: JP H11-304675 A
PTL 5: JP 2011-141293 A

SUMMARY

Technical Problem

However, since the thickness of slag from the surface of molten steel changes constantly, component analysis by immersing some kind of consumable probe in the slag as in the analysis method described in PTL 5 is operationally difficult because controlling the probe height is difficult, and requires time and cost. The analysis method described in PTL 5 is thus not effective in actual refining sites.

It could therefore be helpful to provide a slag component analysis method capable of quickly and accurately measuring slag components generated during refining of molten iron.

Solution to Problem

Upon carefully examining the features and environments of hot metal pretreatment, we conceived a method capable of rapidly and accurately analyzing the components of slag and a method capable of quickly measuring the basicity of the slag without collecting the slag. We discovered that, in hot metal pretreatment in which one converter-type refining furnace is used to continuously perform desiliconization treatment and dephosphorization treatment on hot metal with a deslagging process being performed therebetween, relatively unobstructed observation of slag is possible when slag during the intermediate deslagging process is used and particularly when the slag is observed from the side of the converter-type refining furnace during tilting.

As a method for non-contact and remote analysis of slag during intermediate deslagging, laser induced breakdown spectroscopy (LIBS method) is available. In the LIBS method, an analysis object is irradiated with a high-energy pulse laser to turn part of the analysis object into plasma, and excitation light obtained from the slag turned into plasma is captured and dispersed to perform quantitative analysis from the wavelength and intensity of the emission line corresponding to each element. We analyzed the components of molten slag by the LIBS method in laboratory experiments, and found that quantitative values reflecting chemical analysis values are obtained.

In detail, in the present disclosure, the composition of slag subjected to intermediate deslagging by tilting the converter-type refining furnace is evaluated remotely from the side of the converter-type refining furnace using the principle of emission spectroscopic analysis by a laser light irradiation.

The present disclosure is based on these discoveries. We thus provide the following.

[1] A slag component analysis method comprising:
  irradiating a surface of slag to be analyzed with a pulse laser a plurality of times to turn part of the slag into plasma by;
  dispersing excitation light obtained from the slag turned into plasma and acquiring an emission spectrum of an element contained in the slag per one pulse laser irradiation or per a plurality of pulse laser irradiations; and
  deriving a target component concentration or component amount ratio from the acquired emission spectrum,
  wherein the slag to be analyzed is slag generated in a converter-type refining furnace, and
  in the turning part of the slag into plasma, the pulse laser is applied from a side of the converter-type refining furnace tilted to remove the slag generated in the converter-type refining furnace.

[2] The slag component analysis method according to [1], wherein in the turning part of the slag into plasma, the pulse laser is applied from a position that is closer to a throat of the converter-type refining furnace than a rotation axis of the converter-type refining furnace when the converter-type refining furnace is tilted.

[3] The slag component analysis method according to [1] or [2], wherein in the deriving the target component concentration or component amount ratio, of all emission spectra acquired in the acquiring an emission spectrum per one pulse laser irradiation or per a plurality of pulse laser irradiations, only an emission spectrum in which an emission intensity of at least one element out of Ca, Si, Mg, and Al is greater than or equal to three times a standard deviation $\sigma$ of noise of the emission spectra is used to derive the target component concentration or component amount ratio.

[4] The slag component analysis method according to any one of [1] to [3], wherein in the deriving the target component concentration or component amount ratio, a component concentration or component amount ratio of the slag is estimated from the acquired emission spectrum based on a slag component concentration or component amount ratio estimation model in which an emission spectrum acquired beforehand from slag whose component concentration or component amount ratio is known is an explanatory variable and the corresponding component concentration or component amount ratio in the slag is an objective variable, and the explanatory variable includes at least one emission spectrum in a wavelength range of at least part of the acquired emission spectrum.

[5] The slag component analysis method according to [4], wherein the slag component concentration or component amount ratio estimation model is created through single regression or multivariate regression.

[6] The slag component analysis method according to [5], wherein an analysis method of the multivariate regression is partial least squares.

[7] A slag basicity analysis method comprising obtaining basicity [CaO %/SiO$_2$%] of the slag using the slag component analysis method according to any one of [4] to [6].

[8] A molten iron refining method comprising determining an amount of a slag-forming agent to be added for refining in a next process continuously performed in the converter-type refining furnace after deslagging, based on the basicity [CaO %/SiO$_2$%] of the slag obtained using the slag basicity analysis method according to [7].

[9] The molten iron refining method according to [8], wherein the slag-forming agent contains one or more components selected from CaO, MgO, and FeO.

Advantageous Effect

It is thus possible to, in a hot metal pretreatment technique that continuously performs two refining processes with a deslagging process therebetween using one converter-type refining furnace, quickly and accurately analyze the components of slag during the intermediate deslagging.

BRIEF DESCRIPTION OF THE DRAWINGS

In the Accompanying Drawings:
FIG. 1A is a view for explaining the position of a converter-type refining furnace in a state of facing vertically upward;
FIG. 1B is a view for explaining the position of the converter-type refining furnace in a tilted state.

DETAILED DESCRIPTION (Slag Component Analysis Method)

Figure 2A:
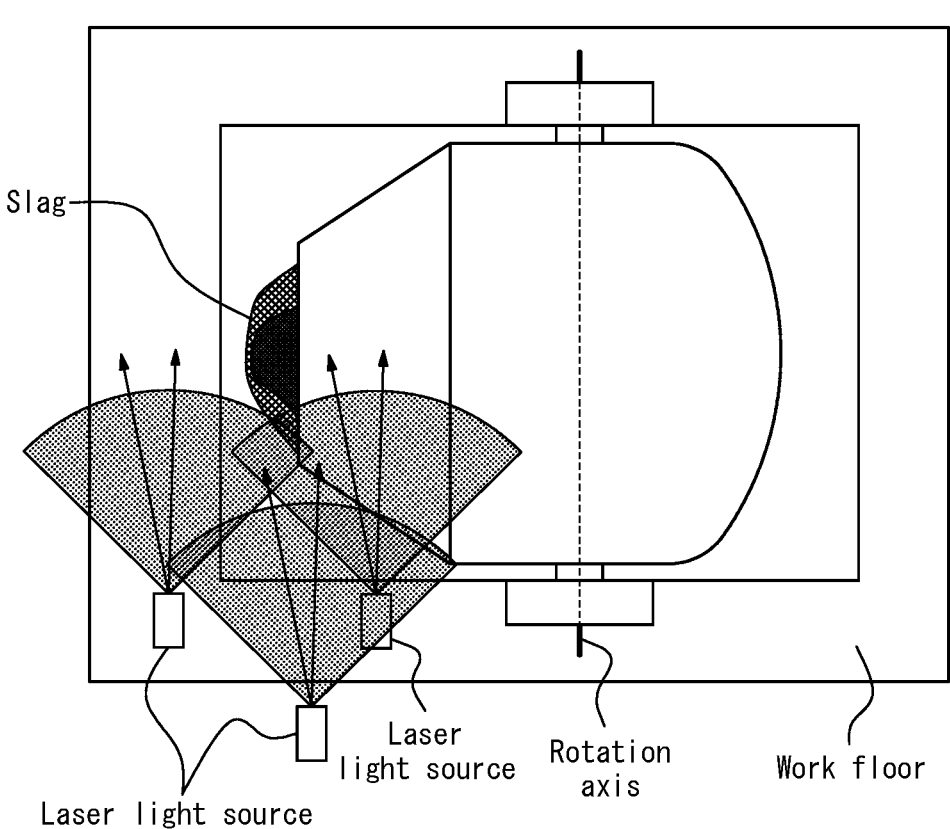
FIG. 2A is a top view illustrating examples of the position of a straight line parallel to a rotation axis of the converter-type refining furnace.

A slag component analysis method according to the present disclosure will be described in detail below, with reference to the drawings. A slag analysis method according to the present disclosure is a slag component analysis method comprising: a process of irradiating a surface of slag to be analyzed with a pulse laser a plurality of times to turn part of the slag into plasma; a process of dispersing excitation light obtained from the slag turned into plasma and acquiring an emission spectrum of an element contained in the slag per one pulse laser irradiation or per a plurality of pulse laser irradiations; and a process of deriving a target component concentration or component amount ratio from the acquired emission spectrum, wherein the slag to be analyzed is slag generated in a converter-type refining furnace, and in the process of turning part of the slag into plasma, the pulse laser is applied from a side of the converter-type refining furnace tilted to remove the slag generated in the converter-type refining furnace. The following description relates to a preferred embodiment of the present disclosure, and the present disclosure is not limited by the following description.

In order to quantitatively evaluate the components of slag, it is necessary to quantitatively analyze the elements that constitute the slag. In typical slag component analysis, quantification is performed using slag in a solid state on the assumption that all elements are oxides each with a single composition. Actually, however, slag may be composed of not only oxides each with a single composition but also various mineral phases, and also the distribution of mineral phases may be uneven in slag in a solid state. In such a case, if part of the slag is analyzed, the component analysis result varies. Hence, when analyzing the components of slag in a solid state, measures are taken such as collecting a slag analysis sample having such a weight with which deviation of mineral phases is negligible and, in some cases, reducing or fine grinding the analysis sample.

However, these operations require an extremely large amount of time just to prepare the analysis sample, and are unsuitable for analysis during intermediate deslagging. On the other hand, since slag during deslagging is in a molten state, i.e. in a liquid state, homogeneity is ensured, and accordingly it suffices to analyze part of such slag. In this case, the LIBS method, which does not require collection of an analysis sample and enables remote analysis, is very suitable.

In component analysis of slag during deslagging by the LIBS method, first, the surface of slag to be analyzed is irradiated with a pulse laser one or more times to turn part of the slag into plasma. Following this, excitation light obtained from the slag turned into plasma is dispersed, and an emission spectrum of each element contained in the slag is integrated per one pulse laser irradiation or per a plurality of pulse laser irradiations to acquire cumulative data. Herein, "one pulse laser irradiation" means applying a pulse laser once. In the case of a double pulse laser that applies a pulse laser twice in a row in proximity in time, applying a pulse laser twice is regarded as one pulse laser irradiation. Whether to acquire data per one pulse laser irradiation or per a plurality of pulse laser irradiations may be selected as appropriate. It is preferable to acquire cumulative data per a plurality of pulse laser irradiations in order to ensure the reliability of the data. The interval between pulses in a double pulse laser is usually several microseconds to several tens of microseconds (for example, 2 microseconds) when used for LIBS.

Next, a method of creating a model for estimating the component concentration or component amount ratio of slag and a method of estimating the component concentration or component amount ratio of slag will be described below. The model for estimating the component concentration or component amount ratio of slag is created by using slag whose component concentration or component amount ratio is known beforehand and machine learning the relationship between an explanatory variable and an objective variable.

[Slag]

In the creation of the model, synthetic slag prepared by changing the content stepwise to correspond to the component to be analyzed and its concentration range is preferably used as the slag whose component concentration or component amount ratio is known. The component concentration or component amount ratio of the synthetic slag may be obtained by subjecting it to X-ray fluorescence analysis by the briquette method.

[Explanatory Variable]

The explanatory variable includes at least one emission spectrum in a wavelength range of at least part of the acquired emission spectrum. Herein, the "emission spectrum" is a data group made up of emission intensities corresponding to respective wavelengths, and the form of explanatory variable is not limited as long as it is information obtained from the emission spectrum. For example, the emission intensity of the emission line of the target component obtained from the emission spectrum may be used as the explanatory variable, the emission spectrum in the wavelength range derived from the target component may be used as the explanatory variable, or at least one of the emission spectrum in the wavelength range derived from the target component and the emission spectrum in the wavelength range derived from non-target component may be used as the explanatory variables. In the case where the objective variable is the ratio of the content (concentration) of $SiO_2$ and the content (concentration) of CaO, the explanatory variable may be the ratio $[I_{Ca}/I_{Si}]$ of the emission intensity $I_{Ca}$ of the emission line of Ca to the emission intensity $I_{Si}$ of the emission line of Si.

[Objective Variable]

The objective variable is the concentration of the target component in the slag in the case of determining the concentration of the target component in the slag, and the ratio of the amount (concentration) of the target component in the slag in the case of determining the ratio of the amount of the target component in the slag.

[Creation of Slag Component Concentration or Component Amount Ratio Estimation Model]

Simple regression or multivariate regression may be used in machine learning for creating the slag component concentration or component amount ratio estimation model.

In the case of using simple regression, the emission intensity or emission intensity ratio of the emission line of the target component obtained from the emission spectrum is preferably used as the explanatory variable. In LIBS analysis, however, even with the same analysis object, the obtained emission intensity varies greatly, and the measurement accuracy is low in some cases.

In the case of using multivariate regression, there are instances in which the emission spectrum includes an emission line of some component having a certain correlation with that of another component for reasons such as overlapping of the emission lines due to the proximity of these emission lines, and such multicollinearity often causes degradation in estimation accuracy in simple multivariate regression. It is therefore desirable to use partial least squares regression (PLS), which is an analysis method that does not cause the problem of collinearity in principle.

In partial least squares regression, after converting explanatory variables into mutually uncorrelated principal component axes, regression analysis is performed with the objective variable using only a small number of principal components. This is convenient when estimating the component concentration or component amount ratio in slag from a plurality of emission spectra with correlation between explanatory variables, and high estimation accuracy can be expected.

Whether to use single regression or multivariate regression may be selected as appropriate depending on the situation.

[Estimation of Component Concentration or Component Amount Ratio of Slag]

Based on the slag component concentration or component amount ratio estimation model created above, the component concentration or component amount ratio of slag whose component concentration or component amount ratio is unknown is estimated. Specifically, for slag during deslagging whose component concentration or component amount ratio is unknown, a sample (slag during deslagging whose component concentration or component amount ratio is unknown) is subjected to LIBS analysis under the same conditions as slag whose component concentration or component amount ratio is known, which was used when generating the model, to obtain an emission spectrum. After this, the emission spectrum of the same definition as the created model is, as an explanatory variable, substituted into the created model, and the component concentration or component amount ratio of the slag as an objective variable is calculated.

Here, in order to analyze the components of the slag during the intermediate deslagging process, it is necessary to accurately irradiate the slag during deslagging with a laser light and at the same time efficiently collect plasma excitation light generated on the slag surface. Hence, from which position the slag during the intermediate deslagging process is irradiated with the laser light to analyze the components in the slag is very important. Slag during deslagging is at a high temperature of about 1300° C., and splashes, fumes, and dust are constantly generated significantly during refining. All of these interfere with the optical paths of the laser light and the plasma excitation light in the LIBS analysis. There is thus the need to avoid their influences in order to directly analyze the components of the slag during intermediate deslagging.

FIGS. 1A and 1B are views for explaining the position of a converter-type refining furnace (typically also referred to as "converter ladle"). As illustrated in FIGS. 1A and 1B, a work floor is installed around the converter-type refining furnace so that workers can operate the converter-type refining furnace, and a pair of trunnions supporting the converter-type refining furnace are placed on the work floor. In the desiliconization treatment process and the dephosphorization treatment process, the converter-type refining furnace is in a state of facing vertically upward (FIG. 1A). In the intermediate deslagging process, the converter-type refining furnace is in a tilted state, i.e. the converter-type refining furnace is rotated about a rotation axis provided between the pair of trunnions supporting the converter-type refining furnace so that the throat of the converter-type refining furnace will face substantially a horizontal direction (FIG. 1B). Herein, the "rotation axis" refers to an axis that is based on a straight line connecting the pair of trunnions of the converter-type refining furnace.

Upon careful examination, we learned that, when the slag is irradiated with a laser light from the front of the tilted converter-type refining furnace illustrated in FIG. 1B or from above the converter-type refining furnace in a state of facing vertically upward illustrated in FIG. 1A, due to significant splashes, fumes, and dust, the laser light is physically blocked and cannot be applied to the slag surface or, even if a laser light irradiation is possible, collecting plasma excitation light is extremely difficult and correct analysis values cannot be obtained. We also learned that splashes, fumes, and dust are irradiated with a laser and undergo excitation emission in some cases, causing errors in slag analysis. Furthermore, since the influence of radiant heat is significant, complex heat resistance measures for the laser equipment are needed, and thus the cost and facility constraints are considerable. Such an analyzer is not desirable as a regular analyzer.

We then studied the position where the slag during intermediate deslagging can be remotely irradiated with a laser light, and discovered that the influence of splashes, fumes, and dust can be greatly reduced by applying a laser light from the side of the converter-type refining furnace. Hence, in the slag component analysis method according to the present disclosure, the slag is irradiated with a laser light from the side of the tilted converter-type refining furnace. In this specification, the direction "from the side of the converter-type refining furnace" is a direction in which the angle between a straight line parallel to the rotation axis of the converter-type refining furnace and the optical path of the laser light is 45° or less with respect to the rotation axis of the converter-type refining furnace.

Figure 2B:
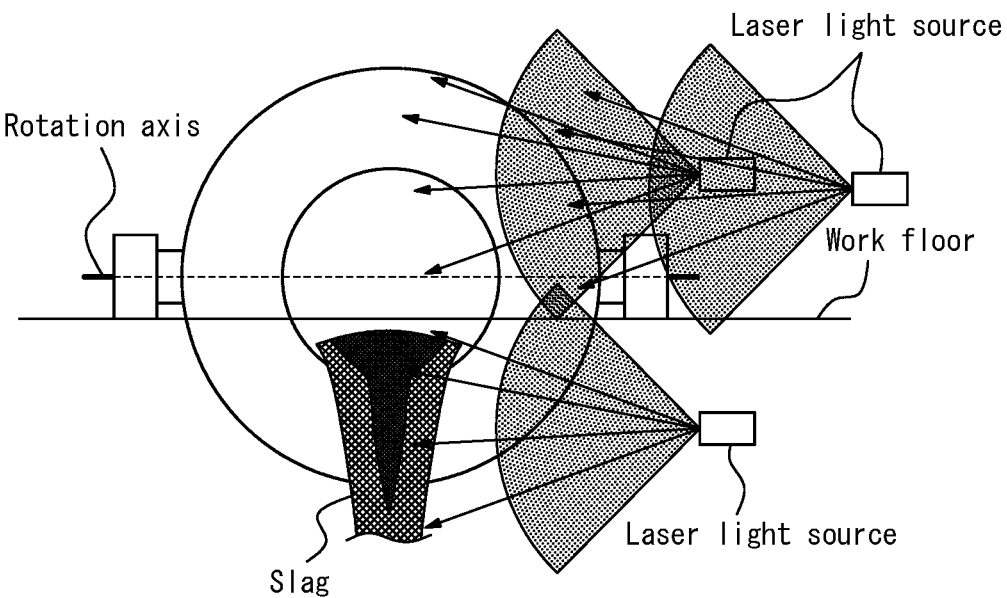
FIG. 2B is a side view illustrating examples of the position of a straight line parallel to the rotation axis of the converter-type refining furnace.

FIGS. 2A and 2B are respectively a top view and a side view illustrating examples of the position (setting) of a straight line parallel to the rotation axis of the converter-type refining furnace. As illustrated in FIGS. 2A and 2B, the "straight line parallel to the rotation axis" may be set at any position in the horizontal direction and vertical direction. As illustrated in FIGS. 2A and 2B, each possible angular range of a laser light is conical.

Preferably, the pulse laser is applied from a position that is closer to the throat than the rotation axis of the converter-type refining furnace is when the converter-type refining furnace is tilted. If the angle between the rotation axis and the laser light is 45° or less, an efficient laser irradiation is possible. If the angle between the rotation axis and the laser light is larger, the distance from the laser irradiation port to the slag is longer. In addition, the laser light irradiation to the slag from a position close to the trunnion is hindered by the converter-type refining furnace itself, whereas the laser light irradiation to the slag from a position far from the trunnion increases the influence of radiant heat. The angle between the rotation axis and the laser light is desirably 20° or less. More preferably, the pulse laser is applied from a horizontal position of the throat of the converter-type refining furnace (for example, the position of a laser light source in FIGS. 3A and 3B (described later)) or a horizontal position on the opposite side of the throat from the rotation axis of the converter-type refining furnace (for example, the position of a laser light source located leftmost in FIG. 2A) when the converter-type refining furnace is tilted.

Figure 3A:
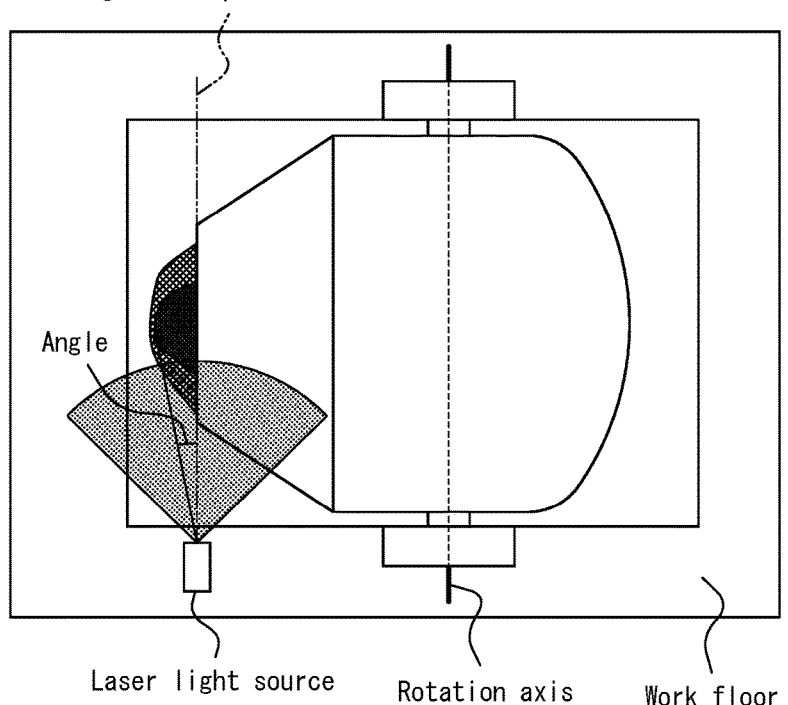
FIG. 3A is a top view illustrating a preferred example of the position of a straight line parallel to the rotation axis of the converter-type refining furnace.
Figure 3B:
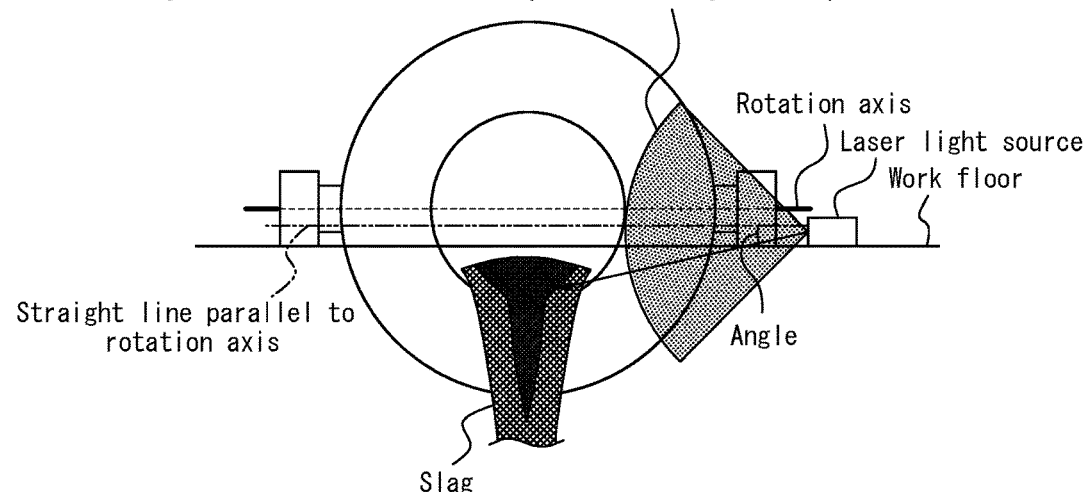
FIG. 3B is a side view illustrating the preferred example of the position of a straight line parallel to the rotation axis of the converter-type refining furnace.

FIGS. 3A and 3B are respectively a top view and a side view illustrating a preferred example of the position of a straight line parallel to the rotation axis of the converter-type refining furnace. In the preferred example illustrated in FIGS. 3A and 3B, the "straight line parallel to the rotation axis" is at a horizontal position of the throat of the tilted converter-type refining furnace.

When irradiating the slag discharged from the tilted converter ladle in the deslagging process with a laser light from the side of the converter-type refining furnace, it is preferable to apply the laser light obliquely downward from the work floor (horizontal plane) beside the converter-type refining furnace from the viewpoint of safety. From the positional relationship between the height of the work floor and the slag to be removed, it is more preferable to apply the laser light obliquely downward in the range of 5° to 30° with respect to the rotation axis of the converter-type refining furnace. The distance from the laser light irradiation position to the slag to be removed is preferably about 5 m to 8 m and more preferably about 6 m in the case of, for example, a converter-type refining furnace with a capacity of 250 tons, assuming that irradiation is performed from the work floor beside the converter-type refining furnace.

Next, a means for performing more accurate component analysis from LIBS data acquired as described above will be described below. Slag during intermediate deslagging is slag in a molten state. Normally, slag has a lower specific gravity than molten iron, and accordingly exists above the molten iron. However, vigorous stirring during refining may cause part of the molten iron to be mixed in the slag. The slag also contains air bubbles due to gas components generated during the refining process. Therefore, when the slag is irradiated with a laser light during intermediate deslagging, not only the target data of the molten slag but also data resulting from excitation emission of molten iron, data for which sufficient excitation emission is not obtained due to air bubbles, etc. are obtained. Since such data cause errors in analyzing the slag components, it is preferable to select only the target emission data derived from the molten slag.

An example of the method for this is to distinguish emission data derived from slag during intermediate deslagging, emission data obtained from molten iron, and data for which sufficient emission intensity is not obtained due to air bubbles, based on the differences in shape between acquired emission spectra.

In an emission spectrum that can be obtained from slag during the intermediate deslagging process, there is a wavelength range in which no emission line is observed. This is because the slag during the intermediate deslagging process does not contain any element having an emission line in the wavelength range. In the case of molten iron, on the other hand, an emission line derived from the molten iron is observed in the wavelength range in which no emission line is observed in the emission spectrum derived from the slag. Moreover, while emission lines of Ca, Si, Mg, Al, etc., which are main components of the slag, are observed in the emission spectrum derived from the slag during the intermediate deslagging process, in an emission spectrum for which sufficient emission intensity is not obtained due to air bubbles, the emission intensities of the emission lines of these elements are lower and, in some cases, are not detectable.

In view of the above, among the emission spectra obtained from the slag during the intermediate deslagging process, the emission spectrum derived from molten iron and the emission spectrum for which sufficient emission intensity is not obtained due to air bubbles can be removed to select an emission spectrum through the use of the wavelength range in which no emission line is observed. Specifically, data in the wavelength range in which no emission line is observed is regarded as noise, and only an emission spectrum in which the emission intensity of at least one element out of Ca, Si, Mg, and Al is greater than or equal to three times the standard deviation $\sigma$ of the noise is adopted among the emission spectra obtained from the slag during the intermediate deslagging process. As a result of only the emission spectrum based on the slag discharged in the intermediate deslagging process being used to calculate the slag components, the slag components can be determined accurately. The wavelength range of the noise is not limited as long as it is a range in which no emission line is observed in the target slag emission spectrum, but is desirably a range that is close to the emission line of the element to be measured and exceeds the full width at half maximum of the emission line of the element to be measured. For example, the wavelength range of the noise is preferably a wavelength range of 311 nm to 314 nm.

When the number of pieces of emission spectrum data extracted by selection, i.e. the number of pieces of emission spectrum data adopted to obtain the slag components, is larger, the slag components can be determined more accurately. For example, 20 to 50 pieces of data per charge are preferable. It is thus desirable to acquire a large number of emission spectra on the assumption that selection is made. Whether to acquire emission spectra per one pulse laser irradiation or per a plurality of pulse laser irradiations may be selected as appropriate depending on the number of pieces of emission spectrum data other than the slag, which may be mixed in, and the measurement time of the slag discharged in the deslagging process to be removed.

(Slag Basicity Analysis Method)

A slag basicity analysis method according to the present disclosure will be described below. The slag basicity analysis method according to the present disclosure may, using the above-described slag component analysis method according to the present disclosure, calculate the Si concentration of slag based on a slag Si concentration estimation model created with the slag Si concentration as an objective variable and obtain the value of $SiO_2\%$ as a result of conversion into oxide concentration, calculate the Ca concentration of the slag based on a slag Ca concentration estimation model created with the slag Ca concentration as an objective variable and obtain the value of CaO % as a result of conversion into oxide concentration, and calculate the basicity [CaO %/$SiO_2$%] of the slag from the ratio of the value of CaO % to the value of $SiO_2$% obtained. Alternatively, the basicity [CaO %/$SiO_2$%] of the slag may be directly calculated based on a slag component amount ratio estimation model created with the slag basicity [CaO %/$SiO_2$%] as an objective variable. Alternatively, the basicity [CaO %/$SiO_2$%] of the slag may be directly calculated based on a slag concentration ratio estimation model created with the ratio [$I_{Ca}/I_{Si}$] of the emission intensity $I_{Ca}$ of the emission line of Ca to the emission intensity $I_{Si}$ of the emission line of Si as an explanatory variable and the slag basicity [CaO %/$SiO_2$%] as an objective variable.

As described above, with the slag component analysis method according to the present disclosure, it is possible to, in a hot metal pretreatment technique that continuously performs two refining processes with a deslagging process therebetween using one converter-type refining furnace, remotely perform LIBS analysis on slag during the intermediate deslagging process from the side of the converter to analyze the components of the slag. As a result, it is possible to determine, from the slag to be analyzed, the basicity [CaO %/SiO$_2$%] of the slag. The slag basicity which is one of the most important indexes in refining of molten iron can thus be analyzed quickly and accurately.

(Molten Iron Refining Method)

A molten iron refining method according to the present disclosure will be described below. The molten iron refining method according to the present disclosure comprises determining an amount of a slag-forming agent to be added for refining in a next process continuously performed in the converter-type refining furnace after deslagging, based on the basicity [CaO %/SiO$_2$%] of the slag obtained using the above-described slag basicity analysis method according to the present disclosure.

An embodiment of the present disclosure including a refining process of pretreating molten iron with an intermediate deslagging process in between will be described below. In hot metal pretreatment in which desiliconization treatment and dephosphorization treatment are performed with an intermediate deslagging process therebetween, the composition of slag before the dephosphorization treatment (i.e. desiliconized slag) needs to be identified in order to determine an appropriate addition amount of a slag-forming agent without excess or deficiency. As described above, with the slag component analysis method according to the present disclosure, the slag during the intermediate deslagging process after the desiliconization treatment is directly subjected to LIBS analysis to perform slag component analysis, in order to quickly analyze the composition of the slag. Moreover, in the dephosphorization treatment process following the intermediate deslagging process, the basicity of the desiliconized slag obtained by the slag basicity analysis method according to the present disclosure and the residual slag amount in the converter-type refining furnace are used to determine such an addition amount of slag-forming agent that achieves the required slag basicity (e.g. 2.2), and the dephosphorization treatment is performed. Here, the residual slag amount is calculated as the difference between the estimated mass of the slag in the furnace before the intermediate deslagging and the slag removal amount estimated from the measured mass of the slag container containing the slag removed as a result of the intermediate deslagging.

Examples of the slag-forming agent to be added include quicklime (CaO), limestone (CaCO$_3$), lime hydrate (Ca(OH)$_2$), dolomite (MgO—CaO), and decarburized slag generated during decarburization treatment. In particular, the slag-forming agent preferably contains one or more components selected from CaO, MgO, and FeO. The slag-forming agent is used to control the CaO content. Further, iron oxide (FeO) is supplied as an oxygen source along with the slag-forming agent.

EXAMPLES

Examples of the present disclosure will be described below, although the present disclosure is not limited to these examples.

Example 1

Figure 4A:
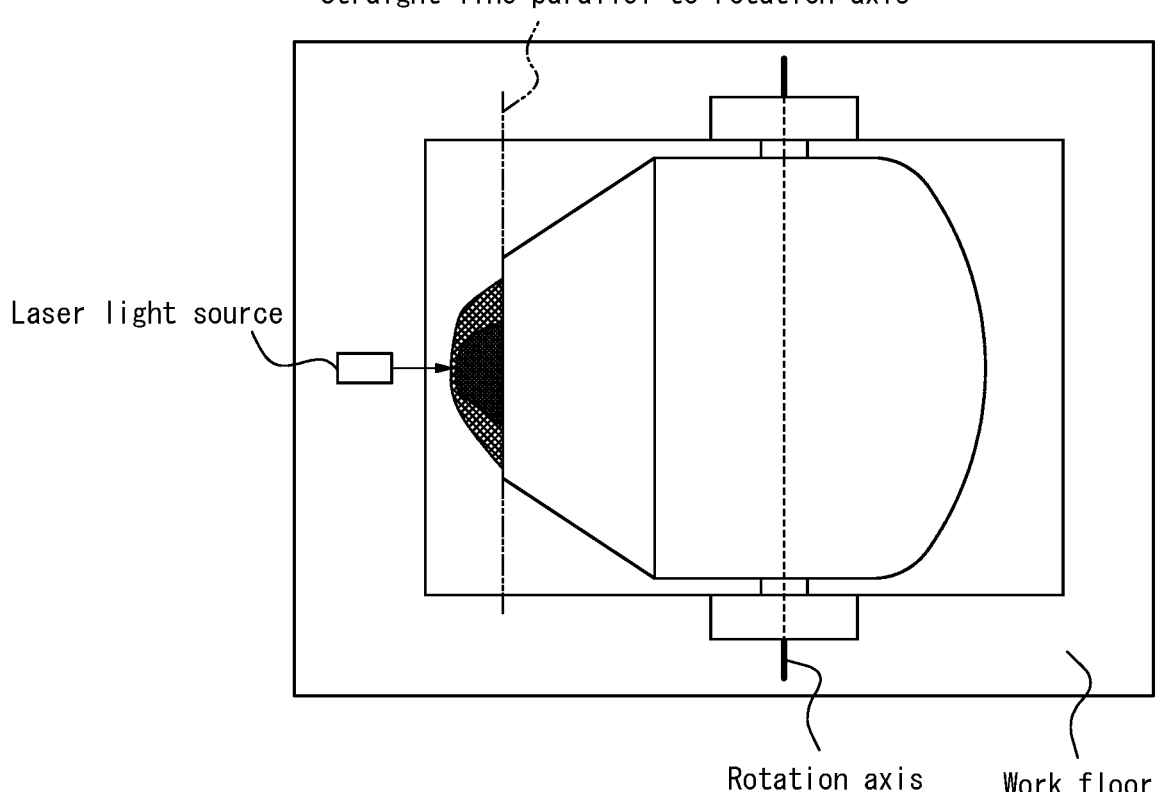
FIG. 4A is a top view illustrating the position of a LIBS analyzer in Comparative Example 1.
Figure 4B:
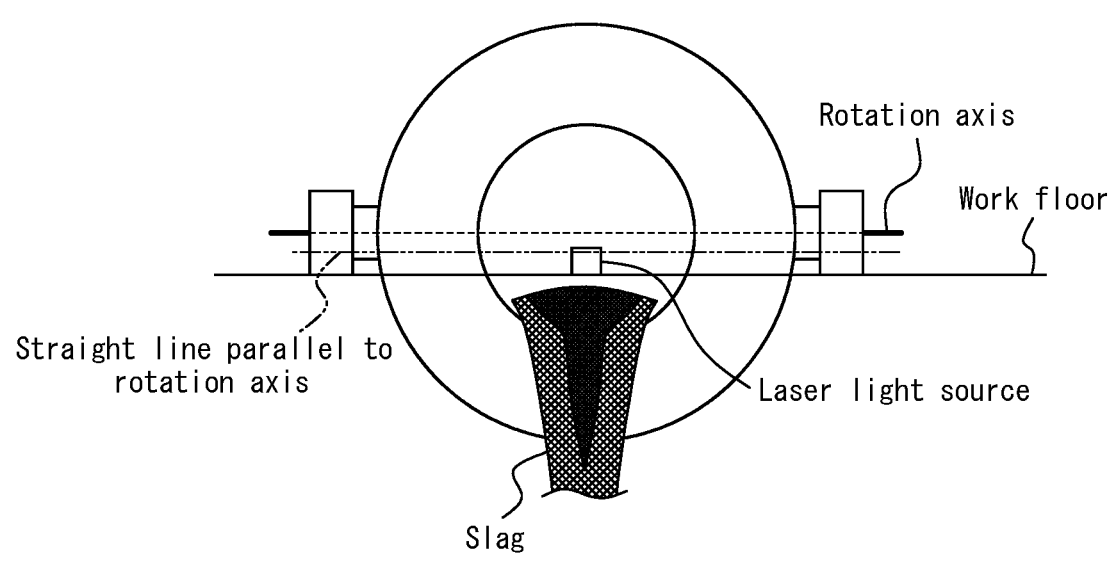
FIG. 4B is a side view illustrating the position of the LIBS analyzer in Comparative Example 1.

In hot metal pretreatment that involves performing desiliconization treatment and dephosphorization treatment with an intermediate deslagging process therebetween using one converter-type refining furnace with a capacity of 250 tons, component analysis on Ca, Si, Mg, and Al in slag during the intermediate deslagging process for three charges (slags A, B, and C) was performed by the slag component analysis method according to the present disclosure. For comparison, slag during intermediate deslagging for other three charges was subjected to LIBS analysis from the front of the converter deslagging port as illustrated in FIGS. 4A and 4B (see Comparative Example 1 below). The slag discharged in intermediate deslagging process was collected after treatment, and chemical analysis values were obtained. The chemical analysis values were obtained through X-ray fluorescence analysis by the briquette method.

The measurement conditions in the LIBS analysis are as follows: A YAG double pulse laser was used as the laser. The laser power was 200 mJ/pulse, the repetition frequency was 15 Hz, and the distance to the slag was 5 m. An optical fiber was provided coaxially with the laser oscillation via a non-axial parabolic mirror, the light was received and the received light was dispersed with a polychromator, and the light was measured with an ICCD camera. 300 pulses of laser were applied per charge, and an emission spectrum per one laser irradiation was collected.

Next, in order to select only an emission spectrum based on the slag during the intermediate deslagging process, data in a wavelength range of 311 nm to 314 nm was used as noise and only an emission spectrum in which the Ca intensity was greater than or equal to three times the standard deviation of the noise was adopted. After this, the intensities of the emission lines of Ca, Si, Mg, and Al were obtained from the obtained emission spectra. The intensity of the emission line was 315.8 nm for Ca, 288.1 nm for Si, 285.2 nm for Mg, and 309.3 nm for Al.

Following this, the obtained intensity of the emission line of a target component in the slag during the intermediate deslagging process as an explanatory variable and the concentration of the target component in the slag during the intermediate deslagging process as an objective variable were substituted into a slag component concentration estimation formula created in the present disclosure, to estimate the concentration of the target component in the slag during the intermediate deslagging process. The resultant concentration of the target component was then converted into % on an oxide basis.

The procedure of creating the slag component concentration estimation formula used in Example 1 will be described below. First, synthetic slags different in component concentration were prepared. Each of the synthetic slags was then subjected to LIBS analysis under the foregoing conditions to determine the intensity of the emission line of the target component. Each of the synthetic slags was also subjected to X-ray fluorescence analysis by the briquette method to determine the concentration of the target component. Simple regression was applied using the intensity of the emission line of the target component obtained from each of the synthetic slags as an explanatory variable and the concentration of the target component as an objective variable, to create the slag component concentration estimation formula corresponding to the target component. Herein, the "target component" means each of Ca, Si, Al and Mg. A slag component concentration estimation formula was created for each component.

In Example 1, a hole was made in the protective wall of the converter-type refining furnace provided in the steel mill, and slag during intermediate deslagging was subjected to LIBS analysis by applying the laser light 10° obliquely downward from the side of the converter. The LIBS device was composed of a laser light source and a photometry portion, and the laser head of the laser light source was made dust-proof and heat-resistant. The photometry portion was installed at a position 9 m away from the laser head using an optical fiber and operated. The laser light source of the LIBS device was installed as illustrated in FIGS. 3A and 3B, and positioned so that the optical path of the laser light would be directed 10° obliquely downward from the work floor (horizontal plane). The obtained component analysis values (% in terms of oxide) of the slag in intermediate deslagging are shown in Table 1.

basicity analysis on slag during the intermediate deslagging process for 40 charges (slags 1 to 40) was performed by the slag basicity analysis method according to the present disclosure. Each slag in intermediate deslagging was collected after treatment, and chemical analysis values were obtained by the same method as in Example 1. Here, slag during the intermediate deslagging process for 30 charges (slags 1 to 30) out of the 40 charges was analyzed by the below-

TABLE 1

| | Slag | | | | | | | | | | | |
| | A (% on an oxide basis) | | | | B (% on an oxide basis) | | | | C (% on an oxide basis) | | | |
| Component | CaO | SiO$_2$ | MgO | Al$_2$O$_3$ | CaO | SiO$_2$ | MgO | Al$_2$O$_3$ | CaO | SiO$_2$ | MgO | Al$_2$O$_3$ |
|---|---|---|---|---|---|---|---|---|---|---|---|---|
| Example 1 | 25.1 | 20.8 | 5.01 | 3.1 | 26.2 | 21.9 | 4.91 | 3.2 | 25.0 | 20.9 | 4.85 | 2.7 |
| Chemical analysis value | 25.6 | 21.0 | 4.95 | 3.0 | 26.0 | 21.5 | 5.05 | 3.1 | 25.0 | 20.5 | 4.81 | 2.5 |

| | Slag | | | | | | | | | | | |
| | D (% on an oxide basis) | | | | E (% on an oxide basis) | | | | F (% on an oxide basis) | | | |
| Component | CaO | SiO$_2$ | MgO | Al$_2$O$_3$ | CaO | SiO$_2$ | MgO | Al$_2$O$_3$ | CaO | SiO$_2$ | MgO | Al$_2$O$_3$ |
|---|---|---|---|---|---|---|---|---|---|---|---|---|
| Comparative Example 1 | 39.4 | 30.1 | 15.1 | — | — | — | — | — | 50.2 | 21.2 | — | — |
| Chemical analysis value | 24.8 | 20.2 | 5.00 | 3.2 | 25.5 | 21.3 | 4.80 | 2.7 | 24.9 | 20.5 | 5.04 | 3.2 |

Comparative Example 1

Component analysis on Ca, Si, Mg, and Al in slag during the intermediate deslagging process for three charges (slags D, E, and F) was performed, as in Example 1. Here, the laser light source of the LIBS device was located in front of the converter-type refining furnace as illustrated in FIGS. 4A and 4B, and a laser light was applied 15° obliquely downward from the front of the throat of the converter-type refining furnace being tilted for the intermediate deslagging process to perform LIBS analysis on the slag during intermediate deslagging. All of the other conditions were the same as those in Example 1. The obtained component analysis values (% in terms of oxide) of the slag in intermediate deslagging are shown in Table 1.

As can be understood from Table 1, in Example 1 (slags A, B, and C), the obtained results were in good agreement with the chemical analysis values. In Comparative Example 1 (slags D, E and F), on the other hand, analysis values for all elements were obtained in only one charge among the three charges, and also there were large deviations from the chemical analysis values. The reason why correct analysis values were not obtained in Comparative Example 1 is considered to be because significant dust generated during the intermediate deslagging process hindered the laser irradiation of the slag during the intermediate deslagging process. Moreover, there is a possibility that the analysis values obtained for some of the elements correspond to emission spectra derived from dust irradiated with a laser, which is not effective for analysis. These results demonstrate that the use of the slag component analysis method according to the present disclosure enables quick and accurate slag component analysis.

Examples 2 and 3

In hot metal pretreatment that involves performing desiliconization treatment and dephosphorization treatment with an intermediate deslagging process therebetween using one converter-type refining furnace with a capacity of 250 tons, described basicity analysis method in Example 2. Slag during the intermediate deslagging process for the remaining 10 charges (slags 31 to 40) was analyzed by the below-described basicity analysis method in Example 3. Emission spectra were collected under the same measurement conditions as in Example 1 in the LIBS analysis.

Next, in order to select only an emission spectrum based on the slag during the intermediate deslagging process, data in a wavelength range of 311 nm to 314 nm was used as noise and only an emission spectrum in which the Ca intensity was greater than or equal to three times the standard deviation of the noise was adopted.

Example 2

In Example 2, the intensities of the emission lines of Ca and Si were determined from the obtained emission spectra. The intensity of the emission line was 315.8 nm for Ca and 288.1 nm for Si.

Following this, the ratio $[I_{Ca}/I_{Si}]$ between the obtained intensity $(I_{Ca})$ of the emission line of Ca and intensity $(I_{Si})$ of the emission lie of Si in the slag during the intermediate deslagging process as an explanatory variable and the slag basicity [CaO %/SiO$_2$%] which is the component amount ratio during the intermediate deslagging process as an objective variable were substituted into a slag component amount ratio (slag basicity [CaO %/SiO$_2$%]) estimation formula obtained in the present disclosure, to estimate the basicity [CaO %/SiO$_2$%] of the slag during the intermediate deslagging process. The estimated basicity is shown in Table 2.

The procedure of creating the slag basicity [CaO %/SiO$_2$%] estimation formula used in Example 2 will be described below. First, synthetic slags different in the ratio (component amount ratio) between the CaO content and the SiO$_2$ content were prepared. Each of the synthetic slags was then subjected to LIBS analysis under the foregoing conditions, the intensities of the emission lines of Ca and Si were determined from the obtained emission spectra, and $[I_{Ca}/I_{Si}]$ was calculated. Each of the synthetic slags was also subjected to X-ray fluorescence analysis by the briquette method to calculate the slag basicity [CaO %/SiO₂%].
Simple regression was applied using $[I_{Ca}/I_{Si}]$ obtained from
each of the synthetic slags as an explanatory variable and the
slag basicity [CaO %/SiO₂%] as an objective variable, to
create the slag basicity [CaO %/SiO₂%] (slag component
amount ratio) estimation formula.

Example 3

In Example 3, the emission spectrum in the wavelength
range of 270 nm to 415 nm (relationship between wave-
length and emission intensity at 1925 points, with a wave-
length interval of about 0.075 nm) was collected from the
obtained emission spectra.

Following this, the obtained emission spectrum in the
wavelength range of 270 nm to 415 nm in the slag during the
intermediate deslagging process as an explanatory variable
and the slag basicity [CaO %/SiO₂%] which is the compo-
nent amount ratio during the intermediate deslagging pro-
cess as an objective variable were substituted into a slag
component amount ratio (slag basicity [CaO %/SiO₂%])
estimation model created in the present disclosure, to esti-
mate the basicity [CaO %/SiO₂%] of the slag during the
intermediate deslagging process. The estimated basicity is
shown in Table 2.

The procedure of creating the slag basicity [CaO
%/SiO₂%] estimation model used in Example 3 will be
described below. First, synthetic slags different in the ratio
(component amount ratio) between the CaO content and the
SiO₂ content were prepared. Each of the synthetic slags was
then subjected to LIBS analysis under the foregoing condi-
tions, and the emission spectrum in the wavelength range of
270 nm to 415 nm (relationship between wavelength and
emission intensity at 1925 points, with a wavelength interval
of about 0.075 nm) was collected from the obtained emis-
sion spectra. Each of the synthetic slags was also subjected
to X-ray fluorescence analysis by the briquette method to
calculate the slag basicity [CaO %/SiO₂%]. Partial least
squares regression which is multivariate regression was
applied using the emission spectrum in the wavelength range
of 270 nm to 415 nm obtained from each of the synthetic
slags as an explanatory variable and the slag basicity [CaO
%/SiO₂%] as an objective variable, to create the slag basic-
ity [CaO %/SiO₂%] (slag component amount ratio) estima-
tion model.

Comparative Example 2

Basicity analysis on slag during the intermediate deslag-
ging process for 40 charges was performed, as in Example
2. Here, the basicity estimated by theoretical calculation was
yielded from the phosphorus distribution ratio, the mass
balance of CaO, and the like. Specifically, on the assumption
that the slag after dephosphorization would be carried over
to the next charge without deslagging, the amount of phos-
phorus tapped was calculated depending on the deslagging
amount from the mass balance of SiO₂ and CaO and the
phosphorus distribution. Using the deslagging amount as a
parameter, the deslagging amount was back-calculated so
that the calculated amount of phosphorus tapped and the
actual amount of phosphorus tapped would match, and the
corresponding slag basicity was calculated from the resul-
tant deslagging amount. The calculated basicity is shown in
Table 2.

As can be understood from Table 2, the accuracy (σd) of
the basicity estimated through single regression in Example
2 by the slag basicity analysis method according to the present disclosure was 0.030 with respect to the chemical
analysis value. For the basicity estimated through multivari-
ate regression in Example 3, σd was ±0.025. For the basicity
calculated in Comparative Example 2, σd was ±0.052. This
demonstrates the usefulness of the slag basicity analysis
method according to the present disclosure.

TABLE 2

| Charge number | Example 2 | Example 3 | Comparative Example 2 (calculated value) | Chemical analysis value |
|---|---|---|---|---|
| 1 | 1.21 | — | 1.23 | 1.21 |
| 2 | 1.24 | — | 1.23 | 1.25 |
| 3 | 1.23 | — | 1.24 | 1.23 |
| 4 | 1.20 | — | 1.23 | 1.22 |
| 5 | 1.23 | — | 1.24 | 1.26 |
| 6 | 1.21 | — | 1.22 | 1.25 |
| 7 | 1.20 | — | 1.21 | 1.24 |
| 8 | 1.20 | — | 1.15 | 1.21 |
| 9 | 1.15 | — | 1.20 | 1.20 |
| 10 | 1.20 | — | 1.19 | 1.19 |
| 11 | 1.22 | — | 1.25 | 1.21 |
| 12 | 1.24 | — | 1.24 | 1.20 |
| 13 | 1.27 | — | 1.36 | 1.18 |
| 14 | 1.25 | — | 1.24 | 1.25 |
| 15 | 1.26 | — | 1.26 | 1.21 |
| 16 | 1.21 | — | 1.26 | 1.24 |
| 17 | 1.25 | — | 1.24 | 1.22 |
| 18 | 1.28 | — | 1.27 | 1.26 |
| 19 | 1.28 | — | 1.24 | 1.25 |
| 20 | 1.25 | — | 1.24 | 1.25 |
| 21 | 1.24 | — | 1.23 | 1.22 |
| 22 | 1.19 | — | 1.22 | 1.21 |
| 23 | 1.23 | — | 1.23 | 1.23 |
| 24 | 1.24 | — | 1.00 | 1.26 |
| 25 | 1.20 | — | 1.19 | 1.22 |
| 26 | 1.21 | — | 1.19 | 1.20 |
| 27 | 1.20 | — | 1.18 | 1.20 |
| 28 | 1.25 | — | 1.22 | 1.23 |
| 29 | 1.27 | — | 1.23 | 1.25 |
| 30 | 1.25 | — | 1.25 | 1.21 |
| 31 | — | 1.26 | 1.28 | 1.25 |
| 32 | — | 1.22 | 1.24 | 1.23 |
| 33 | — | 1.23 | 1.11 | 1.26 |
| 34 | — | 1.21 | 1.22 | 1.21 |
| 35 | — | 1.20 | 1.22 | 1.24 |
| 36 | — | 1.25 | 1.23 | 1.23 |
| 37 | — | 1.17 | 1.21 | 1.23 |
| 38 | — | 1.20 | 1.21 | 1.24 |
| 39 | — | 1.22 | 1.25 | 1.21 |
| 40 | — | 1.24 | 1.26 | 1.26 |

The invention claimed is:

1. A slag component analysis method comprising:
irradiating a surface of slag to be analyzed with a pulse
laser a plurality of times to turn part of the slag into
plasma;
dispersing excitation light obtained from the slag turned
into plasma and acquiring an emission spectrum of
elements contained in the slag once for every pulse
laser irradiation or once for every a plurality of pulse
laser irradiations; and
deriving a concentration or component amount ratio of a
target component among the elements from acquired
emission spectra,
wherein the slag to be analyzed is slag generated in a
converter-type refining furnace, and
the irradiating the surface of slag to be analyzed is done
from a side direction of the converter-type refining
furnace tilted to remove the slag generated in the
converter-type refining furnace, the side direction being
a direction in which an angle between a straight line
parallel to a rotation axis of the converter-type refining furnace and an optical path of the pulse laser is 45° or less with respect to the rotation axis of the converter-type refining furnace.

2. The slag component analysis method according to claim 1, wherein the irradiating the surface of slag to be analyzed is done from a position that is closer to a throat of the converter-type refining furnace than a rotation axis of the converter-type refining furnace when the converter-type refining furnace is tilted.

3. The slag component analysis method according to claim 1, wherein the deriving the concentration or component amount ratio of the target component is done using only an emission spectrum in which an emission intensity of at least one element out of Ca, Si, Mg, and Al is greater than or equal to three times a standard deviation σ of noise of the emission spectrum.

4. The slag component analysis method according to claim 1, wherein deriving the concentration or component amount ratio of the target component comprises:

using regression analysis to create a component amount ratio estimation model, wherein an emission intensity of an emission line of the target component obtained from the emission spectrum is used as an explanatory variable within the model, substituting the explanatory variable with a different explanatory variable corresponding to an emission spectra acquired beforehand from slag whose concentration or component amount ratio of the target component is known, wherein the different explanatory variable includes at least one emission spectrum of at least part of a wavelength range of the acquired emission spectrum, and then using the component amount ratio estimation model to calculate the concentration or component amount ratio of the target component.

5. The slag component analysis method according to claim 4, wherein the model is created through single regression or multivariate regression.

6. The slag component analysis method according to claim 5, wherein an analysis method of the multivariate regression is partial least squares.

7. A slag basicity analysis method comprising obtaining basicity which is defined as a ratio of CaO mass % to $SiO_2$ mass % of the slag using the slag component analysis method according to claim 4.

8. A molten iron refining method comprising determining an amount of a slag-forming agent to be added for refining in a next process continuously performed in the converter-type refining furnace after deslagging, based on the basicity which is defined as a ratio of CaO mass % to $SiO_2$ mass % of the slag obtained using the slag basicity analysis method according to claim 7.

9. The molten iron refining method according to claim 8, wherein the slag-forming agent contains one or more components selected from CaO, MgO, and FeO.

10. The slag component analysis method according to claim 2, wherein the deriving the concentration or component amount ratio of the target component is done using only an emission spectrum in which an emission intensity of at least one element out of Ca, Si, Mg, and Al is greater than or equal to three times a standard deviation σ of noise of the emission spectrum.

11. The slag component analysis method according to claim 2, wherein deriving the concentration or component amount ratio of the target component comprises:

using regression analysis to create a component amount ratio estimation model, wherein an emission intensity of an emission line of the target component obtained from the emission spectrum is used as an explanatory variable within the model, substituting the explanatory variable with a different explanatory variable corresponding to an emission spectra acquired beforehand from slag whose concentration or component amount ratio of the target component is known, wherein the different explanatory variable includes at least one emission spectrum of at least part of a wavelength range of the acquired emission spectrum, and then using the component amount ratio estimation model to calculate the concentration or component amount ratio of the target component.

12. The slag component analysis method according to claim 3, wherein deriving the concentration or component amount ratio of the target component comprises:

using regression analysis to create a component amount ratio estimation model, wherein an emission intensity of an emission line of the target component obtained from the emission spectrum is used as an explanatory variable within the model, substituting the explanatory variable with a different explanatory variable corresponding to an emission spectra acquired beforehand from slag whose concentration or component amount ratio of the target component is known, wherein the different explanatory variable includes at least one emission spectrum of at least part of a wavelength range of the acquired emission spectrum, and then using the component amount ratio estimation model to calculate the concentration or component amount ratio of the target component.

13. The slag component analysis method according to claim 10, wherein deriving the concentration or component amount ratio of the target component comprises:

using regression analysis to create a component amount ratio estimation model, wherein an emission intensity of an emission line of the target component obtained from the emission spectrum is used as an explanatory variable within the model, substituting the explanatory variable with a different explanatory variable corresponding to an emission spectra acquired beforehand from slag whose concentration or component amount ratio of the target component is known, wherein the different explanatory variable includes at least one emission spectrum of at least part of a wavelength range of the acquired emission spectrum, and then using the component amount ratio estimation model to calculate the concentration or component amount ratio of the target component.

14. A slag basicity analysis method comprising obtaining basicity which is defined as a CaO mass % with respect to a $SiO_2$ mass % of the slag using the slag component analysis method according to claim 5.

15. A slag basicity analysis method comprising obtaining basicity which is defined as a ratio of CaO mass % to $SiO_2$ mass % of the slag using the slag component analysis method according to claim 6.

16. A slag basicity analysis method comprising obtaining basicity which is defined as a ratio of CaO mass % to $SiO_2$ mass % of the slag using the slag component analysis method according to claim 11.

17. A slag basicity analysis method comprising obtaining basicity which is defined as a ratio of CaO mass % to $SiO_2$ mass % of the slag using the slag component analysis method according to claim 12.

18. A slag basicity analysis method comprising obtaining basicity which is defined as a ratio of CaO mass % to $SiO_2$ mass % of the slag using the slag component analysis method according to claim 13.

\* \* \* \* \*